United States Patent
Tan et al.

(10) Patent No.: US 7,582,722 B1
(45) Date of Patent: Sep. 1, 2009

(54) PHENYLETHYNYLBENZOPHENONE-ENDCAPPED HYPERBRANCHED POLY(ARYLENE-ETHER-KETONE-IMIDES)

(75) Inventors: Loon-Seng Tan, Centerville, OH (US); David H. Wang, Beavercreek, OH (US); Fred E. Arnold, Jr., Centerville, OH (US); Tara M. Storage, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 405 days.

(21) Appl. No.: 11/700,971

(22) Filed: Jan. 29, 2007

Related U.S. Application Data

(60) Provisional application No. 60/774,801, filed on Feb. 7, 2006.

(51) Int. Cl.
*C08G 73/06* (2006.01)
(52) U.S. Cl. .................................................. 528/423
(58) Field of Classification Search .................. 528/423
See application file for complete search history.

(56) References Cited

U.S. PATENT DOCUMENTS 6,639,042 B1  10/2003  Baek et al.

OTHER PUBLICATIONS

J.B. Baek et al., "A New Hyperbranched Poly(arylene-ether-ketone-imide): Synthesis, Chain-End Functionalization, and Blending with a Bis(maleimide)", Macromolecules, 2002, pp. 4951-4959, vol. 35.
H. Qin et al, "Modification of Bisphenol-A Based Bismaleimide Resin (BPA-BMI) with an Allyl-Terminated Hyperbranched Polymide (AT-PAEKI)", Polymer, 2006, pp. 2813-2821, vol. 47(8).
D.H. Wang et al., "Synthesis and Characterization of Hyperbranched Poly(arelene-ether-ketone-imide)s Containing Phenylethynyl Groups", Polymer Preprints (American Chemical Society, Division of Polymer Chemistry), 2005, pp. 793-794, vol. 46(1).
D.H. Wang et al., "Phthalonitrile-Terminated Hyperbranched Poly(arylene-ether-ketone-imide): Synthesis and its Blending with 4,4'-bis(3,4-dicyanophenoxy)biphenyl", Polymer Preprints (American Chemical Society, Division of Polymer Chemistry), 2005, pp. 727-728, vol. 46(1).
D.H. Wang et al., "Propargyl-Terminated Hyperbranched Poly(arylene-ether-ketone-imide) with Various Molecular Weights and Blends with an Ethynyl-Terminated Bisimide Resin", Polymer Preprints (American Chemical Society, Division of Polymer Chemistry), 2004, pp. 651-652, vol. 45(2).
D.H. Wang et al., Synthesis and Characterization of Acetylene-Terminated Hyperbranched Poly(Arylene-ether-ketone-imide)s. Polymer Preprints (American Chemical Society, Division of Polymer Chemistry), 2006, pp. 298-299, vol. 47(1).
C.M. Thompson et al., "Aryl Ethynyl Terminated Imide Oligomers and Their Cured Polymers", Macromolecules, 2002, pp. 5835-5839, vol. 35.
T.H. Hou, "Processing Robustness for a Phenylethynyl-Terminated Polyimide Composite", Journal of Applied Polymer Science, Sep. 2004, pp. 3212-3221, vol. 100.

*Primary Examiner*—Randy Gulakowski
*Assistant Examiner*—Shane Fang
(74) *Attorney, Agent, or Firm*—AFMCLO/JAZ; Bart S. Hersko

(57) ABSTRACT

Novel ether-ketone-imide hyperbranched polymers with non-reactive benzophenone or thermally reactive phenylethynyl endgroups were prepared from the corresponding $AB_2$ monomer and benzophenone-based endcapping agent in one-pot fashion. The resulting polymer has repeating units of the formula:

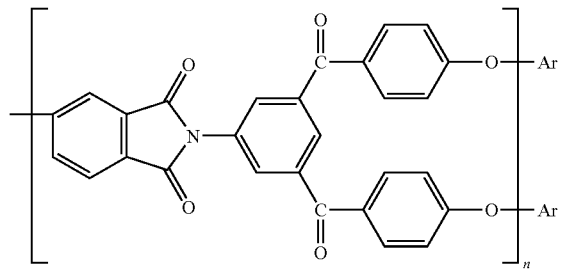

where the chain-end groups, Ar's, are 4-benzophenone or 4-benzophenone with ortho, meta- or para-phenylethynyl substituents in the 4'-position.

8 Claims, No Drawings ical and costly in scale-up production. Synthesis of a hyperbranched polymer, on the other hand, is a one-pot process. Large quantities of hyperbranched polymers can be easily produced from $AB_x$ ($x \geq 2$) monomers. In some cases, the desired hyperbranched polymers can also be prepared from the polymerization of appropriate $A_2$ and $B_3$ or $A_3$ and $B_2$ monomers, where all these monomers are commercially available, thus obviating the added cost in the synthesis of $AB_2$ monomers.

PHENYLETHYNYLBENZOPHENONE-ENDCAPPED HYPERBRANCHED POLY(ARYLENE-ETHER-KETONE-IMIDES)

CROSS REFERENCE TO RELATED APPLICATION

This application claims priority of the filing date of Provisional Application Ser. No. 60/774,801, filed on Feb. 7, 2006.

RIGHTS OF THE GOVERNMENT

The invention described herein may be manufactured and used by or for the Government of the United States for all governmental purposes without the payment of any royalty.

BACKGROUND OF THE INVENTION

The present invention relates to thermally reactive hyperbranched ether-ketone-imide polymers, particularly to those that are chain-end functionalized with phenylethynyl groups.

Dendritic macromolecules such as dendrimers and hyperbranched polymers are a class of highly branched polymers that have distinctly different properties from their linear analogs. Both dendrimers and hyperbranched polymers have much lower solution and melt viscosities than their linear analogs of similar molecular weights. They also have a large number of chain-ends whose collective influence dictates their overall physical and/or chemical behaviors. These features are attractive in terms of processability and offering flexibility in engineering required properties for specific applications. However, there is a practical advantage that hyperbranched polymers have over dendrimers at "raw material" level. Although dendrimers have precisely controlled structures (designated as generations), their preparations generally involve tedious, multi-step sequences that are impractical and costly in scale-up production. Synthesis of a hyperbranched polymer, on the other hand, is a one-pot process. Large quantities of hyperbranched polymers can be easily produced from $AB_x$ ($x \geq 2$) monomers. In some cases, the desired hyperbranched polymers can also be prepared from the polymerization of appropriate $A_2$ and $B_3$ or $A_3$ and $B_2$ monomers, where all these monomers are commercially available, thus obviating the added cost in the synthesis of $AB_2$ monomers.

Because of it non-entangling nature, hyperbranched polymers generally exhibit significantly lower solution and melt viscosities than their structurally similar linear counterparts. As such, various hyperbranched polymers have been used in lowering the melt viscosity in the processing of thermoplastics and thermosetting polymers.

Accordingly, it is an object of the present invention to provide thermally reactive, heat-resistant hyperbranched ether-ketone polymers that containing phenylethyl groups that can thermally-induced to self-polymerized to form cross-linked polymers.

It is another object of this invention to provide a chemically compatible formulation of a phenylethynyl-terminated hyperbranched polymer and a phenylethynyl-terminated oligoimide resin that are suitable for resin-transfer molding (RTM) process in the manufacture of high temperature composites. Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided new ether-ketone-imide hyperbranched polymers with the following repeating units of the formula:

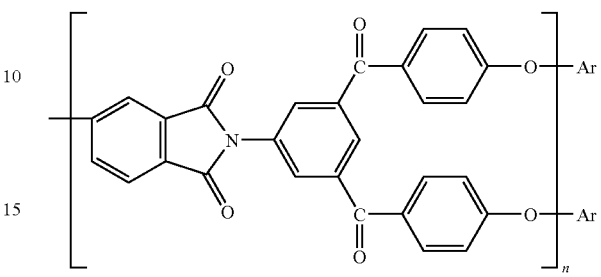

where the chain-end groups, Ar's, are 4-benzophenone or 4-benzophenone with ortho-, meta- or para-phenylethynyl substituents in the 4'-position, and n=10-20.

DETAILED DESCRIPTION OF THE INVENTION

Aromatic polyimides (PIs) are well known, high-performance materials with widespread applications in the aerospace and electronics industries due to their excellent thermomechanical and dielectric properties. However, when fully imidized, most aromatic PI's have limited solubility in common organic solvents, thus restricting the choice in their processing options. Numerous research efforts have been focused on organo-soluble P is from the modification of the structure without substantially decreasing rigidity of their backbone. Solubility is sought to allow processing polymers with preformed imide units and, many problems associated with handling poly(amic acid) (PAA) precursors can be avoided. In addition, homogeneous, post-polymer reactions of soluble aromatic polyimides would also allow better control in the introduction of desirable functional groups.

Another viable alternative to attaining solubility in aromatic P is to change the traditional, linear geometry of the macromolecules to three-dimensional, highly branched (dendritic) architecture. As a subset of dendritic polymers, hyperbranched polymers have several important advantages such as better solubility compare to their linear counterparts, and easier synthesis than their analogous dendrimers, which involve tedious multi-step synthesis. Large quantity of hyperbranched polymers can be easily produced from $AB_x$ ($x \geq 2$) monomers.

There have been only few reports on synthesis of hyperbranched PIs and their utilization. Thus, an objective of this invention was to provide the compositions of hyperbranched poly(ether-ketone-imide) with reactive phenylethynyl chain ends. Such reactive hyperbranched polymers may be useful as an additive to lower and stabilize melt-viscosity in the processing of high-temperature phenylethynyl-based thermosets.

There are two key starting materials required for the synthesis of the subject phenylethynyl-terminated hyperbranched ether-ketone-imide polymers, namely (a) $AB_2$ monomer that can polymerize via a facile aromatic fluoride displacement reaction and (b) the endcapping agent that can undergo similar fluoride displacement reaction to allow a one-pot synthesis operation. Thus, ortho-, meta-, and para-bromobenzoyl chlorides were treated with excess fluorobenzene in presence of aluminum chloride to afford 4-fluoro-2'

(3' or 4')-bromobenzophenones, which were subsequently coupled with phenylacetylene by the palladium-catalyzed reaction to yield 4-fluoro-2' (3' or 4')-phenylethynylbenzophenones As shown in the following scheme, the $AB_2$ monomer, N-[3,5-bis(4-hydroxybenzoyl)benzene]-4-fluorophthalimide, (as described in U.S. Pat. No. 6,512,124, incorporated herein by reference) was self-polymerized in an N-methylpyrrolidinone (NMP)/toluene mixture in the presence of potassium carbonate to afford the potassium salt form of hydroxyl-terminated poly(arylene-ether-ketone-imide) (HT-PAEKI), which, without isolation, was directly functionalized with 4-fluoro-4'-, 3'- or 2'-(phenylethynyl)benzophenones afforded three phenylethynyl terminated hyperbranched polymers, labeled as 4'PE-PAEKI, 3'PE-PAEKI and 2'PE-PAEKI. HT-PAEKI was also similarly functionalized with 4-fluorobenzophenone to afford a non-reactive HB analog for comparison purposes.

branched polymers the linearity of terminating groups becomes less important since the hyperbranched structures have already disrupted the packing ability of terminating groups. The $T_g$'s are possibly influenced by the terminating group rotation. The linear endgroups, such as para-(phenylethynyl)benzophenone group, was able to rotate better than its nonlinear (meta- and ortho) counterparts. This may explain that the $T_g$ of (para)4'PE-PAEKI was lower than those of 3'-(meta) and (ortho)2'PE-PAEKI. 4'PE-PAEKI displayed an exotherm peak ($\Delta H_{exo}$=146 J/g) at 369° C. while 3'PE-PAEKI displayed an exotherm peak ($\Delta H_{exo}$=184 J/g) at 340° C. 2'PE-PAEKI exhibited a much lower-temperature exotherm peaked ($\Delta H_{exo}$=153 J/g) at 264° C. While the exact origin for the apparently enhanced thermal reactivity is still unclear, it is speculated that the intramolecular reactions or even intramolecular cyclizations might have happened at an elevated temperatures, resulting in a much lower exotherm peak. 4'PE-PAEKI exhibited an onset temperature of 276° C.

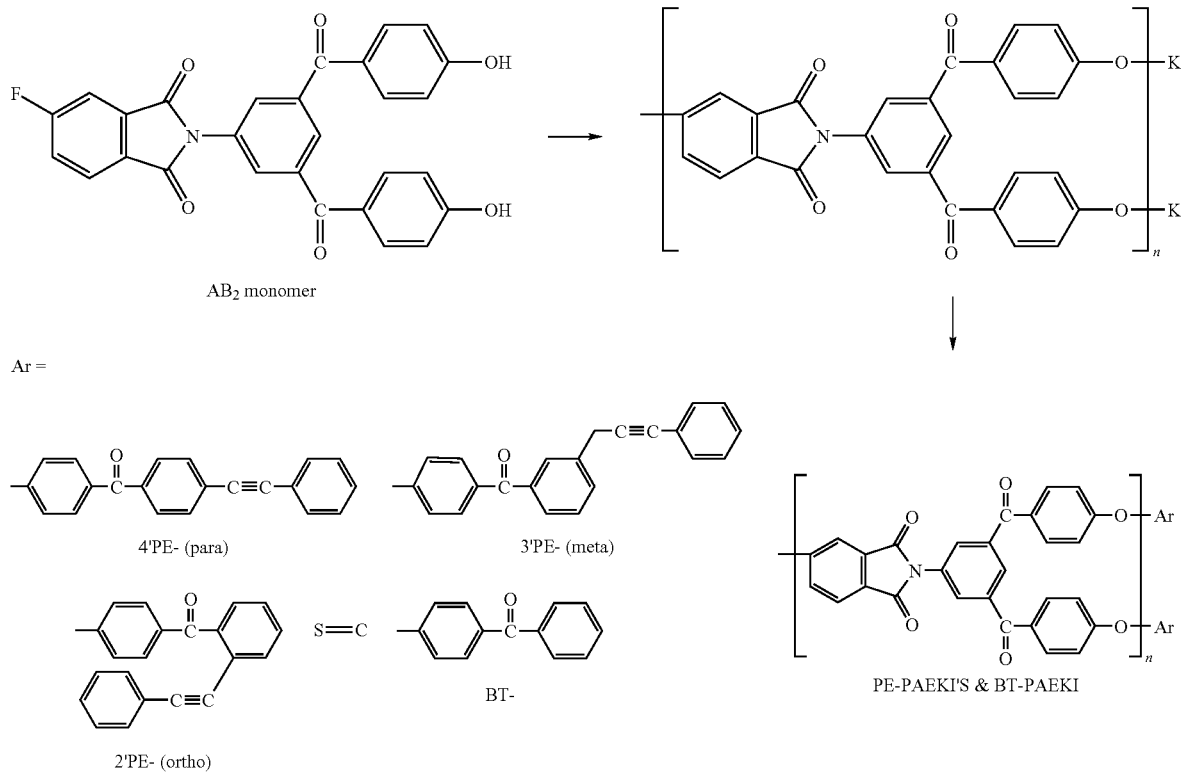

All the hyperbranched polymers were subjected to differential scanning calorimetric (DSC) testing under $N_2$ atmosphere from room temperature up to 450° C. HT-PAEKI displayed a $T_g$ at 225° C. The $T_g$ value of 4'PE-PAEKI was 167° C., which was 11 and 14° C. lower than those of 2'- and 3'PE-PAEKI. It was concluded that the $T_g$ difference was not resulted from the molecular weight disparity since it was similar in all the three polymers.

Hyperbranched polymers have a pseudo-globular structure with numerous terminating groups, which have more influence on the polymer properties, such as glass transition temperatures and solubility, than the two endgroups of the linear analogs. The meta and ortho units in linear polymers tend to decrease the $T_g$ because they disrupt the packing of polymer chains and create more free volume. In the case of hyperand processing window of 109° C. On the other hand, 3' and 2'-PE-PAEKI's displayed lower onset temperatures, 211 and 198° C., respectively. Both had narrower processing windows (33° C. for 3'PE-PAEKI and 17° C. for 2'PE-PAEKI) than 4'PE-PAEKI. The 4'PE-PAEKI peak was narrow and symmetric while the 3'- and 2'PE-PAEKI peaks were broad and non-symmetric. After the first heating run no $T_g$s were observed for 4' and 3'PE-PAEKIs. The crosslinking densities of both polymers were so high that their glass transition temperatures were possibly higher than 450° C., at which the polymers started to decompose. 2'PE-PAEKI exhibited a $T_g$ of 254° C. This seems to further support that 2'PE-PAEKI mostly underwent intramolecular reactions during the cure process, resulting in a lower crosslinking density, i.e., a lower $T_g$, than 4'- and 3'-isomers after a heat treatment.

Phenylethynyl-terminated imide oligomers are an important class of thermosetting resins for use as high-temperature polymer matrices in carbon-fiber composites. They are generally prepared from appropriate ratios of (i) an aromatic amine such as para-phenylenediamine, meta-phenylenediamine, 4,4'-oxydianiline, 4,4'-methylenedianiline, etc.; (ii) an aromatic dianhydride such as 2,2'-bis(3,4-dicarboxyphenyl) hexafluoropropane dianhydride (6FDA), benzophenone-tetracarboxylic-3,3',4,4'-dianhydride, 4,4'-oxydiphthalic anhydride, biphenyl-3,3',4,4'-tetracarboxylic dianhydride, etc and (iii) phenylethynyl-containing endcapping agents such as 4-phenylethynylphthalic anhydride (4-PEPA), 3- or 4-phenylethynylaniline, etc. These resins can be represented by the following generic structure:

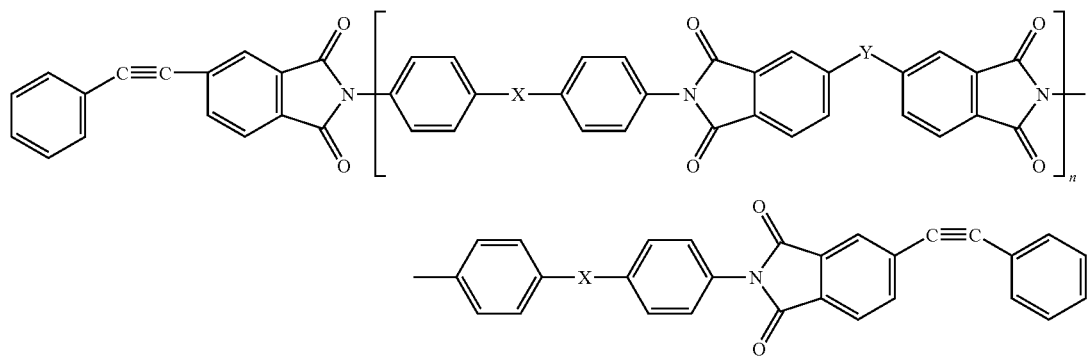

Where X=—CH$_2$—, —O—, —(CF$_3$)$_2$C—, ; Y=nil, —C(O)—, —(CF$_3$)$_2$C—, O, n=1-15

4'PE-PAEKI was incorporated into two resin systems designated as PE-RTM & PE-4). PE-RTM with an average repeat unit of one and PE-4 with an average of 4 repeat units are synthesized from 2,2'-bis(3,4-dicarboxyphenyl) hexafluoropropane dianhydride (6FDA), 4-phenylethynylphthalic anhydride (4-PEPA) and meta-phenylenediamine. Their generic structure is shown as follows:

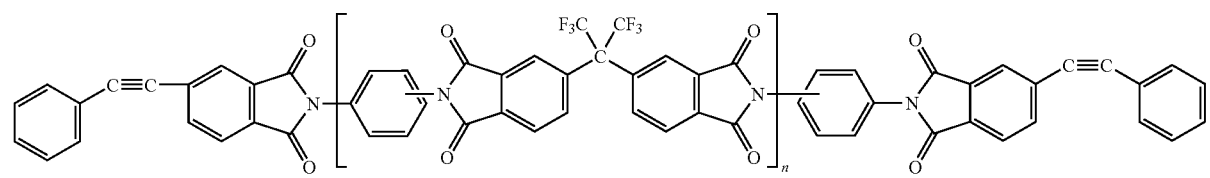

Where n=1-4

The goal for PE-RTM formulation is to reduce the overall viscosity as well as improving toughness and resistance to microcracking. It was found that the glass transition temperature of PE-RTM remained constant for concentrations of 4'PE-PAEKI additive below 10 wt %. Furthermore, 4'PE-PAEKI was formulated with PE-RTM polyimide solutions with weight percentages varying between 0 and 20% for melt-viscosity determination as a function of weight percent additive for PE-RTM. Dynamic measurements of viscosity indicated an incremental increase from 4000 cp in excess of 8000 cp for concentrations greater than 3% by weight. Isothermal (280° C.) measurements reveal an initial decrease in viscosity followed by an overall increase to greater than 10,000 cp for concentration exceeding 5% by weight. Thus, the formulation was optimized at between 1 and 3%, preferably about 2% of the phenylethynyl-terminated imide oligomers with the subject phenylethynyl-terminated hyperbranched ether-ketone-imide polymers because of the temporal stability of its melt viscosity at typical processing temperature of 280° C.

The following Examples illustrate the invention:

EXAMPLE 1

4-Bromo-4'-fluorobenzophenone

Into a 250 mL three-necked round-bottomed flask equipped with a magnetic stirrer and nitrogen inlet and outlet were added fluorobenzene (73.0 g, 0.760 mol) and 4-bromobenzoyl chloride (25.0 g, 0.114 mol). The mixture was then cooled to 0° C. and anhydrous aluminum chloride (17.6 g, 0.130 mol) was added in several portions. The mixture was stirred at room temperature for 30 min, heated to reflux for 4 h and stirred at room temperature for 16 h. The mixture was poured into 5% hydrochloric acid. The organic layer was diluted with methylene chloride and separated with the aid of a separatory funnel. Methylene chloride was removed under reduced pressure. The resulting white solid residue was dissolved in hot ethanol and allowed to cool to room temperature to give 27.0 g (85.0% yield) of white crystals, m.p. 108-109° C. (Lit.[11] 108° C.). FT-IR (KBr, cm$^{-1}$): 1647(carbonyl). Mass spectrum (m/e): 278, 280 (M$^+$). $^1$H-NMR (CDCl$_3$, δ in ppm): 7.12-7.18 (t, 2H, Ar—H, 7.62 (s, 4H, Ar—H) and 7.78-7.83 (m, 2H, Ar—H). $^{13}$C-NMR (CDCl$_3$, δ in ppm): 115.42, 115.74, 127.49, 131.34, 131.63, 132.50, 132.61, 133.27, 133.33, 136.12, 163.54, 167.28, 193.98.

EXAMPLE 2

3-Bromo-4'-fluorobenzophenone

Into a 250 mL three-necked round-bottomed flask equipped with a magnetic stirrer and nitrogen inlet and outlet were added fluorobenzene (73.0 g, 0.760 mol) and 3-bromobenzoyl chloride (25.0 g, 0.114 mol). The mixture was then cooled to 0° C. and anhydrous aluminum chloride (17.6 g, 0.130 mol) was added in several portions. The mixture was stirred at room temperature for 30 min, heated to reflux for 4 h and stirred at room temperature for 16 h. The mixture was poured into 5% hydrochloric acid. The organic layer was diluted with methylene chloride and separated with the aid of a separatory funnel. Methylene chloride was removed under reduced pressure. The resulting white solid residue was dissolved in hot ethanol and allowed to cool to room temperature to give 28.3 g (89.0% yield) of white crystals, m.p. 84-85° C. (Lit. melting point not reported). Anal. Calcd. for C$_{13}$H$_8$BrFO: C, 55.94%; H, 2.89%. Found: C, 55.91%; H, 2.87%. FT-IR (KBr, cm$^{-1}$): 1648 (carbonyl). Mass spectrum (m/e): 278, 280 (M$^+$). $^1$H-NMR (CDCl$_3$, δ in ppm): 7.14-7.21 (m, 2H, Ar—H), 7.34-7.40 (t, 1H, Ar—H), 7.66-7.74 (m, 2H, Ar—H) and 7.81-7.90 (m, 3H, Ar—H). $^{13}$C-NMR (CDCl$_3$, δ in ppm): 115.53, 153.85, 122.65, 128.38, 129.96, 132.64, 132.75, 133.13, 135.35, 139.32, 163.71, 167.484, 193.63.

EXAMPLE 3

2-Bromo-4'-fluorobenzophenone

Into a 250 mL three-necked round-bottomed flask equipped with a magnetic stirrer and nitrogen inlet and outlet were added fluorobenzene (73.0 g, 0.760 mol) and 3-bromobenzoyl chloride (25.0 g, 0.114 mol). The mixture was then cooled to 0° C. and anhydrous aluminum chloride (17.6 g, 0.130 mol) was added in several portions. The mixture was stirred at room temperature for 30 min, heated to reflux for 4 h and stirred at room temperature for 16 h. The mixture was poured into 5% hydrochloric acid. The organic layer was diluted with methylene chloride and separated with the aid of a separatory funnel. Methylene chloride was removed under reduced pressure. The resulting white solid residue was dissolved in hot ethanol and allowed to cool to room temperature to give 27.3 g (86.0% yield) of white crystals, m.p. 51-53° C. (Lit. 49.5-50° C.). Anal. Calcd. for C$_{13}$H$_8$BrFO: C, 55.94%; H, 2.89%. Found: C, 55.98%; H, 2.90%. FT-IR (KBr, cm$^{-1}$): 1672(carbonyl). Mass spectrum (m/e): 278, 280 (M$^+$). $^1$H-NMR (CDCl$_3$, δ in ppm): 7.10-7.16 (t, 2H, Ar—H), 7.31-7.43 (m, 3H, Ar—H), 7.62-7.66 (dd, 1H, Ar—H) and 7.81-7.86 (m, 2H, Ar—H. $^{13}$C-NMR (CDCl$_3$, δ in ppm): 115.74, 116.05, 119.39, 127.34, 128.87, 131.32, 132.58, 132.81, 132.96, 133.24, 140.39, 164.26, 168.03, 194.29.

EXAMPLE 4

4-fluoro-4'-(phenylethynyl)benzophenone

Into a 250 mL three-necked round-bottomed flask equipped with a magnetic stirrer and nitrogen inlet and outlet were added 4-bromo-4'-fluorobenzophenone (10.0 g, 35.8 mmol), phenylacetylene (3.66 g, 35.8 mmol), triphenylphosphine (0.1 g), cuprous iodide (0.05 g), bis(triphenylphosphine) palladium dichloride (0.05 g) and 150 mL of triethylamine. The mixture was heated to reflux for 4 h and stirred at room temperature for 16 h. The mixture was poured into 5% hydrochloric acid and the precipitate was collected by filtration. The resulting solid residue was recrystallized from acetone to afford 8.7 g (81% yield) of white crystals, m.p. 151-152° C. (lit. 150-152° C.). Anal. Calcd. for C$_{21}$H$_{13}$FO: C, 83.99%; H, 4.36%. Found: C, 83.70%; H, 4.43%. FT-IR (KBr, cm$^{-1}$): 2212 (ethynyl), 1650(carbonyl) and 1225 (arylfluoride). Mass spectrum (m/e): 300 (M$^+$, 100% relative abundance). $^1$H-NMR (CDCl$_3$, δ in ppm): 7.13-7.86 (m, Ar—H). $^{13}$C-NMR (CDCl$_3$, δ in ppm): 88.55, 92.58, 115.39, 115.71, 122.62, 127.66, 128.46, 128.84, 129.90, 131.46, 131.75, 132.52, 132.67, 133.62, 136.58, 163.54, 167.28, 194.44.

EXAMPLE 5

4-fluoro-3'-(phenylethynyl)benzophenone

Into a 250 mL three-necked round-bottomed flask equipped with a magnetic stirrer and nitrogen inlet and outlet were added 4-bromo-4'-fluorobenzophenone (10.0 g, 35.8 mmol), phenylacetylene (3.66 g, 35.8 mmol), triphenylphosphine (0.1 g), cuprous iodide (0.05 g), bis(triphenylphosphine)palladium dichloride (0.05 g) and 150 mL of triethylamine. The mixture was heated to reflux for 24 h. The mixture was poured into 5% hydrochloric acid and the precipitate was collected by filtration. The resulting solid residue was recrystallized from ethanol to afford 9.3 g (87% yield) of white crystals, m.p. 108-110° C. Anal. Calcd. for C$_{21}$H$_{13}$FO: C, 83.99%; H, 4.36%. Found: C, 83.82%; H, 4.37%. FT-IR (KBr, cm$^{-1}$): 2210 (ethynyl), 1649(carbonyl) and 1237 (arylfluoride). Mass spectrum (m/e): 300 (M$^+$, 100% relative abundance). $^1$H-NMR (CDCl$_3$, δ in ppm): 7.15-7.91 (m, Ar—H). $^{13}$C-NMR (CDCl$_3$, δ in ppm): 88.26, 90.54, 115.48, 115.79, 122.73, 123.74, 128.44, 128.56, 128.64, 129.38, 131.69, 132.64, 132.78, 133.42, 135.23, 137.74, 163.66, 167.42, 194.50.

EXAMPLE 6

4-fluoro-2'-(phenylethynyl)benzophenone

Into a 250 mL three-necked round-bottomed flask equipped with a magnetic stirrer and nitrogen inlet and outlet were added 4-bromo-4'-fluorobenzophenone (10.0 g, 35.8 mmol), phenylacetylene (3.66 g, 35.8 mmol), triphenylphosphine (0.1 g), cuprous iodide (0.05 g), bis(triphenylphosphine)palladium dichloride (0.05 g) and 150 mL of triethylamine. The mixture was heated at 60° C. for 48 h. The mixture was poured into 5% hydrochloric acid. The organic layer was diluted with methylene chloride and separated with the aid of a separatory funnel. Methylene chloride was removed under reduced pressure. The resulting liquid was extracted with heptane twice and the solvent was removed. The liquid was subjected to chromatography (silica gel, 1:1 CH2Cl2/hexane as an eluent) to afford 3.4 g (42% yield) of yellow liquid, which was solidified at room temperature, m.p. 54-57° C. Anal. Calcd. for $C_{21}H_{13}FO$: C, 83.99%; H, 4.36%. Found: C, 83.71; H, 4.42%. FT-IR (KBr, cm$^{-1}$): 2217 (ethynyl), 1668(carbonyl) and 1237 (aryl-fluoride). Mass spectrum (m/e): 300 (M$^+$, 100% relative abundance). $^1$H-NMR (CDCl$_3$, δ in ppm): 7.05-7.92 (Ar—H). $^{13}$C-NMR (CDCl$_3$, δ in ppm): 87.31, 95.20, 115.33, 115.68, 121.61, 122.42, 128.15, 128.26, 128.46, 130.39, 131.52, 132.52, 132.75, 132.87, 133.65, 133.71, 141.16, 163.88, 167.63, 195.36.

EXAMPLE 7

4'-Phenylethynyl End-Capped Hyperbranched Poly(arylene-ether-imide)

Into a 100 mL three-necked, round-bottomed flask equipped with a magnetic stirrer, nitrogen inlet and outlet, and Dean-Stark trap with a condenser, N-[3,5-bis(4-hydroxybenzoyl)benzene]-4-fluorophthalimide (2.0 g, 4.6 mmol), potassium carbonate (1.4 g, 10.0 mmol), and a mixture of NMP (30 mL) and toluene solvent were placed. The reaction mixture was then heated and maintained at 140-150° C. for 4 h. During this time period, the water formed was removed by toluene azeotropic distillation via a Dean-Stark trap. After complete removal of toluene by an increased the flow of nitrogen, the orange solution was then heated at 160° C. for 3 h. The solution became brown in color and viscous. Some precipitate was observed 30 min after reaction temperature had reached 160° C. Then potassium carbonate (1.4 g, 10.0 mmol) and 4-fluoro-4'-phenylethynylbenzophenone (2.9 g, 9.6 mmol) were placed. The reaction mixture was then heated and maintained at 170-180° C. for 10 h. After being allowed to cool down on its own, the mixture was poured into a beaker containing 5% hydrochloric acid (300 mL). The resulting precipitate was collected by suction filtration and air-dried. Off-white powder was dissolved in NMP again and passed through a cake of Celite 545 to remove any insoluble salts. The filtrate was poured in a beaker containing 5% hydrochloric acid (300 mL) and warmed up to around 60-70° C. for 2 h. The white powder was collected and Soxhlet extracted with methanol for 24 h. It was then dried under the reduced pressure over phosphorus pentoxide at 100° C. for 48 h. The yield was essentially quantitative. [η]=0.10 dL/g. $T_g$=167° C. Anal. Calcd. for $C_{31}H_{17}NO_6$: C, 74.55%; H, 3.43%; N, 2.80%; O, 19.22%. Found: C, 75.66%; H, 3.98%; N, 2.28%; O, 17.48%. FT-IR (KBr, cm$^{-1}$): 2216 (ethynyl). $^1$H-NMR (DMSO-d$_6$; δ in ppm): 7.16-8.39 (Ar—H).

EXAMPLE 8

3'-Phenylethylnyl End-Capped Hyperbranched Poly(arylene-ether-imide)

Into a 100 mL three-necked, round-bottomed flask equipped with a magnetic stirrer, nitrogen inlet and outlet, and Dean-Stark trap with a condenser, N-[3,5-bis(4-hydroxybenzoyl)benzene]-4-fluorophthalimide (2.0 g, 4.6 mmol), potassium carbonate (1.4 g, 10.0 mmol), and a mixture of NMP (30 mL) and toluene solvent were placed. The reaction mixture was then heated and maintained at 140-150° C. for 4 h. During this time period, the water formed was removed by toluene azeotropic distillation via a Dean-Stark trap. After complete removal of toluene by an increased the flow of nitrogen, the orange solution was then heated at 160° C. for 3 h. The solution became brown in color and viscous. Some precipitate was observed 30 min after reaction temperature had reached 160° C. Then potassium carbonate (1.4 g, 10.0 mmol) and 4-fluoro-3'-phenylethynylbenzophenone (2.9 g, 9.6 mmol) were placed. The reaction mixture was then heated and maintained at 170-180° C. for 10 h. After being allowed to cool down on its own, the mixture was poured into a beaker containing 5% hydrochloric acid (300 mL). The resulting precipitate was collected by suction filtration and air-dried. Off-white powder was dissolved in NMP again and passed through a cake of Celite 545 to remove any insoluble salts. The filtrate was poured in a beaker containing 5% hydrochloric acid (300 mL) and warmed up to around 60-70° C. for 2 h. The white powder was collected and Soxhlet extracted with methanol for 24 h. It was then dried under the reduced pressure over phosphorus pentoxide at 100° C. for 48 h. The yield was essentially quantitative. [η]=0.11 dL/g. $T_g$=181° C. Anal. Calcd. for $C_{31}H_{17}NO_6$: C, 74.55%; H, 3.43%; N, 2.80%; O, 19.22%. Found: C, 73.94%; H, 3.76%; N, 2.25%; O, 20.05%. FT-IR (KBr, cm$^{-1}$): 2210 (ethynyl). $^1$H-NMR (DMSO-d$_6$; δ in ppm): 7.16-8.39 (Ar—H).

EXAMPLE 9

2'-Phenylethynyl End-Capped Hyperbranched Poly(arylene-ether-imide)

Into a 100 mL three-necked, round-bottomed flask equipped with a magnetic stirrer, nitrogen inlet and outlet, and Dean-Stark trap with a condenser, N-[3,5-bis(4-hydroxybenzoyl)benzene]-4-fluorophthalimide (2.0 g, 4.6 mmol), potassium carbonate (1.4 g, 10.0 mmol), and a mixture of NMP (30 mL) and toluene solvent were placed. The reaction mixture was then heated and maintained at 140-150° C. for 4 h. During this time period, the water formed was removed by toluene azeotropic distillation via a Dean-Stark trap. After complete removal of toluene by an increased the flow of nitrogen, the orange solution was then heated at 160° C. for 3 h. The solution became brown in color and viscous. Some precipitate was observed 30 min after reaction temperature had reached 160° C. Then potassium carbonate (1.4 g, 10.0 mmol) and 4-fluoro-2'-phenylethynylbenzophenone (2.9 g, 9.6 mmol) were placed. The reaction mixture was then heated and maintained at 170-180° C. for 10 h. After being allowed to cool down on its own, the mixture was poured into a beaker containing 5% hydrochloric acid (300 mL). The resulting precipitate was collected by suction filtration and air-dried. Off-white powder was dissolved in NMP again and passed through a cake of Celite 545 to remove any insoluble salts. The filtrate was poured in a beaker containing 5% hydrochloric acid (300 mL) and warmed up to around 60-70° C. for 2 h. The white powder was collected and Soxhlet extracted with methanol for 24 h. It was then dried under the reduced pressure over phosphorus pentoxide at 100° C. for 48 h. The yield was essentially quantitative. [η]=0.10 dL/g. $T_g$=178° C. Anal. Calcd. for $C_{31}H_{17}NO_6$: C, 74.55%; H, 3.43%; N, 2.80%; O, 19.22%. Found: C, 75.64%; H, 3.83%; N, 2.51%; O, 18.02%. FT-IR (KBr, cm$^{-1}$): 2217 (ethynyl). $^1$H-NMR (DMSO-d$_6$; δ in ppm): 7.16-8.39 (Ar—H).

EXAMPLE 10

4-Benzophenone End-Capped Hyperbranched Poly(arylene-ether-imide)

Into a 100 mL three-necked, round-bottomed flask equipped with a magnetic stirrer, nitrogen inlet and outlet, and Dean-Stark trap with a condenser, N-[3,5-bis(4-hydroxybenzoyl)benzene]-4-fluorophthalimide (3.60 g, 8.28 mmol), potassium carbonate (2.52 g, 18.0 mmol), and a mixture of NMP (30 mL) and toluene solvent were placed. The reaction mixture was then heated and maintained at 140-150° C. for 4 h. During this time period, the water formed was removed by toluene azeotropic distillation via a Dean-Stark trap. After complete removal of toluene by an increased the flow of nitrogen, the orange solution was then heated at 160° C. for 3 h. The solution became brown in color and viscous. Some precipitate was observed 30 min after reaction temperature had reached 160° C. Then potassium carbonate (2.52 g, 36.0 mmol) and 4-fluorobenzophenone (3.40 g, 17.3 mmol) were placed. The reaction mixture was then heated and maintained at 170-180° C. for 10 h. After being allowed to cool down on its own, the mixture was poured into a beaker containing 5% hydrochloric acid (300 mL). The resulting precipitate was collected by suction filtration and air-dried. Off-white powder was dissolved in NMP again and passed through a cake of Celite 545 to remove any insoluble salts. The filtrate was poured in a beaker containing 5% hydrochloric acid (300 mL) and warmed up to around 60-70° C. for 2 h. The white powder was collected and Soxhlet extracted with methanol for 24 h. It was then dried under the reduced pressure over phosphorus pentoxide at 100° C. for 48 h. The yield was essentially quantitative. [η]=0.13 dL/g. $T_g$=182° C. Anal. Calcd. for $C_{31}H_{17}NO_6$: C, 74.55%; H, 3.43%; N, 2.80%; O, 19.22%. Found: C, 73.32%; H, 3.94%; N, 2.20%; O, 20.54%. $^1$H-NMR (DMSO-$d_6$; δ in ppm): 7.16-8.39 (Ar—H).

EXAMPLE 11

Formulations of Phenylethynyl-Terminated Thermoset Resin (PE-RTM) and 4'PE-PAEKI PE-RTM resin was synthesized from 2,2'-bis(3,4-dicarboxyphenyl) hexafluoropropane dianhydride (6FDA), 4-phenylethynyl phthalic anhydride (4-PEPA) and meta-phenylene diamine (mPDA). The stoichiometry of 6FDA, 4-PEPA and mPDA was adjusted so that the average repeat unit of the resulting PE-RTM resin is one. Several formulations primarily based on phenylethynyl-terminated reactive-oligomers chemistry were investigated. The use of mPDA resulted in a pre-imidized oligomer with a glass transition temperature of 183° C. and a processing window in excess of 197° C. (based on $T_g$). Although the use of mPDA and 4-PEPA results in a large processing window, there is a further need to reduce viscosity and improve the overall toughness of the fully cured resin. The addition of 4'PE-PAEKI as an additive should improve processing as well as toughness thus reducing the possibility of microcracks. Thus, both 4'PE-PAEKI and imidized PE-RTM were dissolved in 1-methyl-2-pyrrolidinone (NMP) varying the weight percent of 4'PE-PAEKI in between 1-20%. The resulting solution was then precipitated in water followed by three 200 mL washings with methanol. The powder was allowed to dry overnight and was then transferred to a vacuum oven with the following ramp and drying times; 160° C. for 4 hrs, 200° C. for 4 hrs and 240° C. for 4 hrs.

Melt viscosities of the formulations were measured as a function of weight percent additive for PE-RTM. Dynamic measurements of viscosity indicated an incremental increase from 4000 cp in excess of 8000 cp for concentrations greater than 3% by weight. Isothermal measurements revealed an initial decrease in viscosity followed by an overall increase to greater than 10,000 cp for concentration exceeding 5% by weight. Thus, the formulation was optimized at 2% because of the temporal stability of its melt viscosity.

Having thus described exemplary embodiments of the present invention, it should be noted by those skilled in the art that the disclosures herein are exemplary only and that alternatives, adaptations and modifications may be made within the scope of the present invention.

We claim:

1. An ether-ketone-imide hyperbranched polymer having repeating units of the formula:

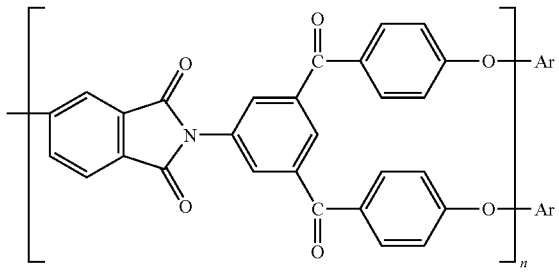

wherein n=10-20, and Ar is a 4-benzophenone with ortho-, para- or meta-phenylethynyl substituents in the 4'-position.

2. The polymer of claim 1 where Ar is a thermally non-reactive 4-benzophenone.

3. A method for synthesizing the polymer of claim 1 comprising:

a) heating N-[3,5-bis(4-hydroxybenzoyl)benzene]-4-fluorophthalimide in an N-methylpyrrolidinone/toluene mixture in the presence of potassium carbonate to form a hydroxyl-terminated poly(arylene-ether-ketone-imide); and b) without isolation, directly functionalizing said hydroxyl-terminated poly(arylene-ether-ketone-imide) with 4-fluoro-2'-, 3'- or 4'-(phenylethynyl)benzophenone to produce the corresponding phenylethynyl terminated hyperbranched polymer.

4. A method for synthesizing the polymer of claim 2 comprising:

a) heating N-[3,5-bis(4-hydroxybenzoyl)benzene]-4-fluorophthalimide in an N-methylpyrrolidinone/toluene mixture in the presence of potassium carbonate to form a hydroxyl-terminated poly(arylene-ether-ketone-imide);

b) without isolation, directly functionalizing said hydroxyl-terminated poly(arylene-ether-ketone-imide) with 4-fluorobenzophenone to form the corresponding benzophenone-terminated hyperbranched polymer.

5. A mixture of the polymer of claim 1 and a phenylethynyl-terminated oligoimide resin with the following formula:

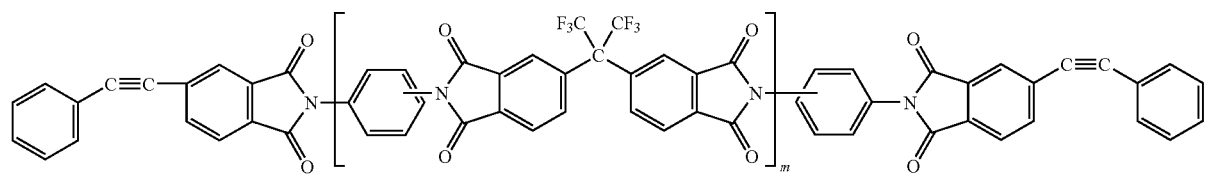
wherein m is 0 to 4.
6. The mixture of claim 5 wherein the polymer of claim 1 comprises from 1 to 3%, by weight, of the mixture.
7. The mixture of claim 6 wherein the polymer of claim 1 comprises about 2%, by weight, of the mixture.
8. The mixture of claim 5 wherein Ar is para-phenylethynyl-4-benzophenone.
* * * * *